May 7, 1940.  M. E. MARTELLOTTI  2,199,465
PATTERN CONTROLLED MILLING MACHINE
Filed Jan. 31, 1938  4 Sheets-Sheet 1

INVENTOR.
MARIO E. MARTELLOTTI
BY
ATTORNEY.

May 7, 1940.  M. E. MARTELLOTTI  2,199,465
PATTERN CONTROLLED MILLING MACHINE
Filed Jan. 31, 1938  4 Sheets-Sheet 3
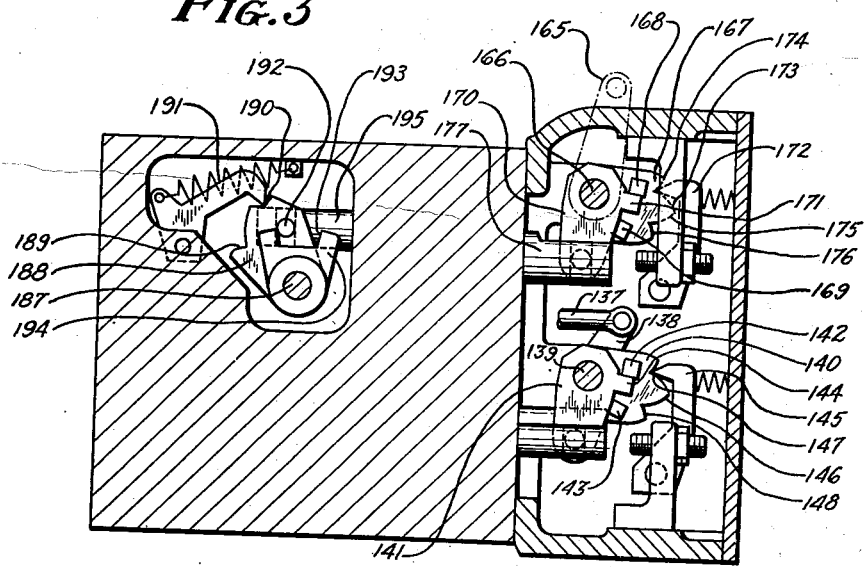
Fig. 3
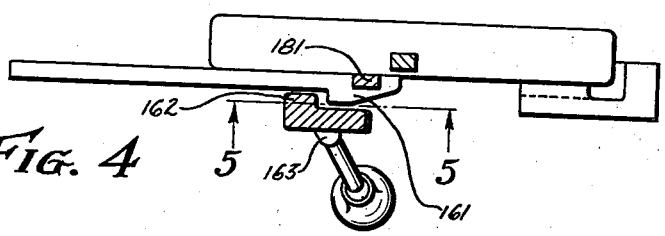
Fig. 4
Fig. 5
INVENTOR.
MARIO E. MARTELLOTTI
BY
HHParsons
ATTORNEY.

May 7, 1940.  M. E. MARTELLOTTI  2,199,465
PATTERN CONTROLLED MILLING MACHINE
Filed Jan. 31, 1938   4 Sheets-Sheet 4
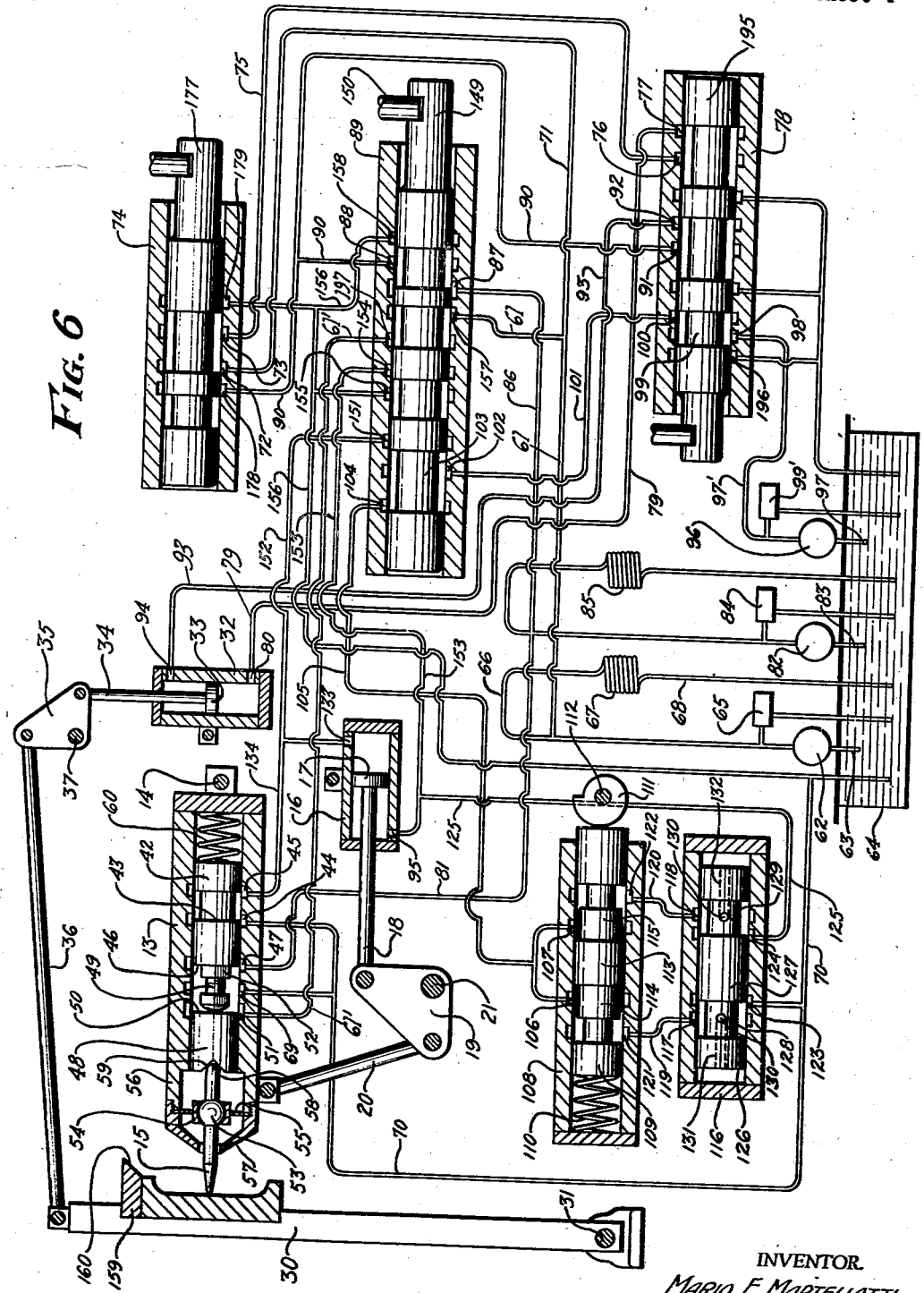
INVENTOR.
MARIO E. MARTELLOTTI
BY
A. K. Parsons
ATTORNEY.

Patented May 7, 1940

2,199,465

UNITED STATES PATENT OFFICE 2,199,465

PATTERN CONTROLLED MILLING MACHINE

Mario E. Martellotti, Cincinnati, Ohio, assignor to The Cincinnati Milling Machine Company, Cincinnati, Ohio, a corporation of Ohio Application January 31, 1938, Serial No. 187,819

11 Claims. (Cl. 90—13.5)

This invention relates to machine tools and more particularly to a pattern controlled milling machine.

One of the objects of this invention is to provide a simple, inexpensive hydraulic control circuit by which a tracer may efficiently and automatically vary the path of movement between a work piece and a cutter in accordance with a pattern.

Another object of this invention is to provide an improved hydraulic control circuit for the purpose described which has individual pumps for controlling the separate movements and which is so contrived that oscillatory effects are eliminated.

A further object of this invention is to provide a hydraulic control circuit for a pattern controlled machine tool which is simple to construct and operate and which is composed of a relatively few number of parts.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 3 is a detail section on the line 3—3 of Figure 1.

Figure 4 is a detail view of the trip mechanism on the pattern support.

Figure 5 is a section on the line 5—5 of Figure 4.

Figure 6 is a diagrammatic view of the hydraulic control circuit.

Figure 1:
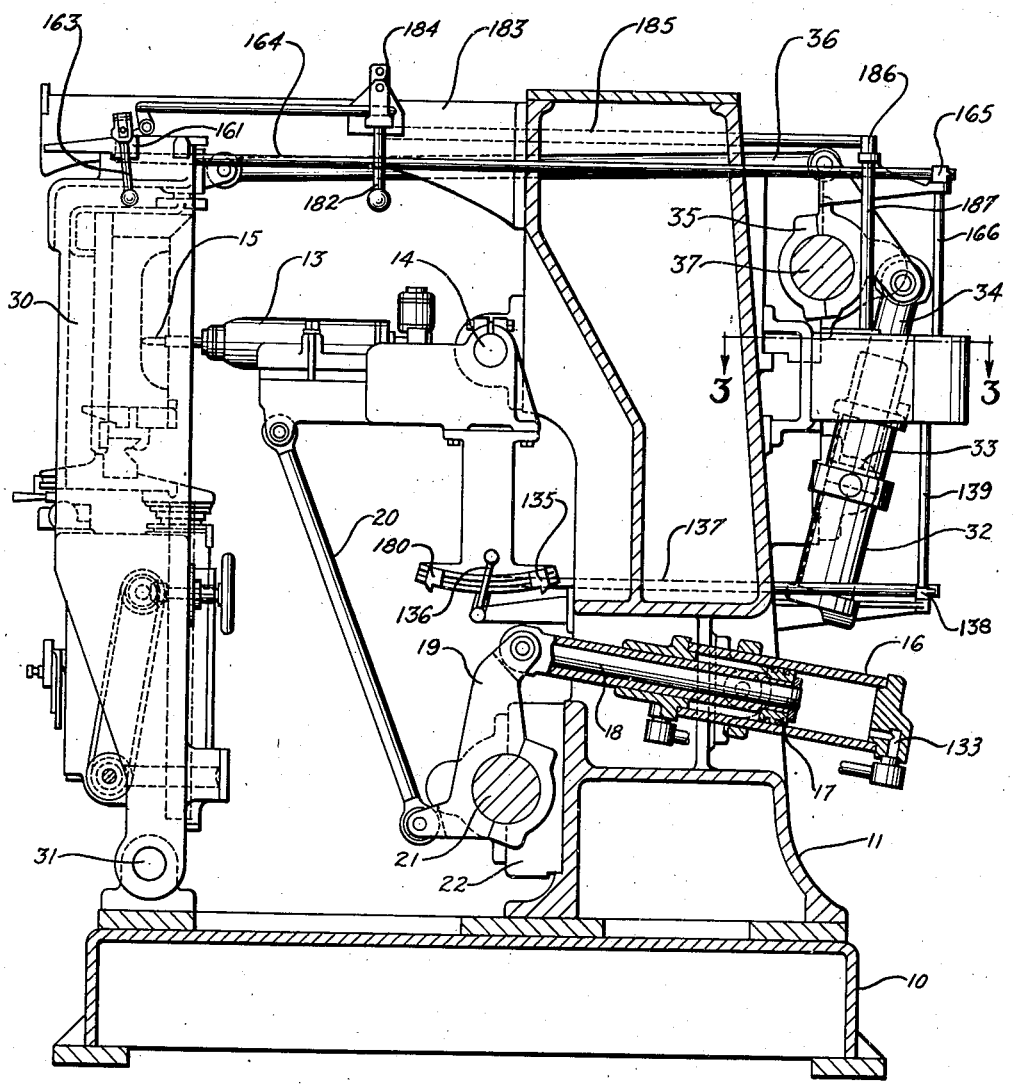
Figure 1 is a vertical section through a machine embodying the principles of this invention.
Figure 2:
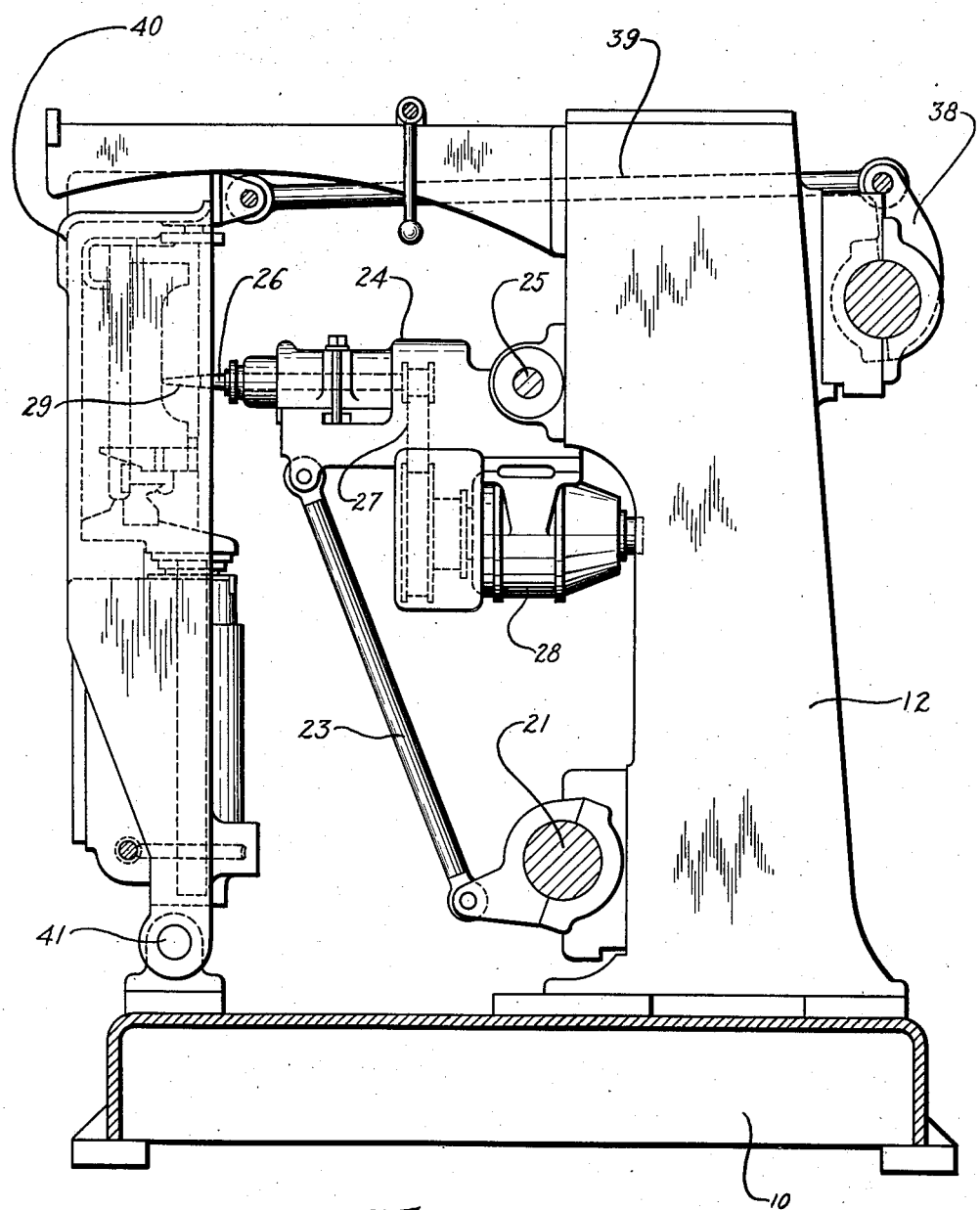
Figure 2 is an elevation showing the cutter and work support units.

This invention may be applied to a machine, such as shown in Figures 1 and 2, having a base 10 from which uprise two columns 11 and 12. The column 11, shown in Figure 1, has a tracer support 13 pivotally supported thereon by pin 14 whereby the end of the tracer 15 is adapted to move through an arcuate path. This movement is effected by a hydraulic motor comprising a cylinder 16 having a contained piston 17 which is connected by a piston rod 18 to a crank member 19. This crank is connected by a link 20 to the tracer support 13.

The crank 19 is keyed to the shaft 21 which is journaled in bearings 22 carried by the column. This shaft extends to column 12, as shown in Figure 2, and is connected by a link 23 to a cutter support carrier 24, which is pivotally mounted at 25 on the front of the column 12. The carrier 24 has a cutter spindle 26 journaled therein, which is connected by a belt 27 to an electric motor 28 mounted on the under side of the carrier for movement therewith. A suitably shaped cutter 29 may be secured in the end of the cutter spindle for movement through an arcuate path similar to the path of movement of the tracer. Thus the piston 17 may effect oscillatory movement of both the tracer and cutter.

The pattern carrier 30, Figure 1, is pivotally supported at 31 on the base 10 for movement toward and from the tracer 15. This movement is effected by a hydraulic motor comprising a cylinder 32 having a contained piston 33 which is connected by a piston rod 34 to a crank 35. This crank is connected by a link 36 to the top of the tracer support 30. The crank 35 is keyed to a shaft 37 which is journaled in the upper part of columns 11 and 12. The shaft 37 is also connected by a crank 38 and a link 39 to the upper end of a work carrier 40, Figure 2, which is pivotally mounted at 41 on the base 10. It will now be apparent that the piston 33 is adapted to swing the pattern and work carriers through an arcuate path toward and from the tracer and cutter respectively. By properly controlling the movement of pistons 17 and 33, relative movement between the tracer and the pattern, and between the cutter and work may be effected in two directions whereby an irregular contour on the pattern may be reproduced in the work.

A hydraulic control circuit whereby the tracer may accurately control these movements is diagrammatically illustrated in Figure 6 of the drawings.

The tracer support 13 contains the tracer controlled valve including a plunger which is made in two parts. One part 42, Figure 6, is provided with an annular groove 43 which is made of such width that when the valve is in a neutral position, the groove will partially uncover ports 44 and 45. Since these ports and the groove control the flow in the feed line, it is preferable that these ports each be halfway open, so that upon movement of the member 42 in either direction from its central position, one or the other of the ports will be further closed to restrict the flow in the feed line.

With the part 42 positioned so that the groove 43 is central with respect to the ports 44 and 45, end face 46 of part 42 is finished to the proper dimension so that it will partially uncover port 47. The second part of the plunger comprises the spool 48, and this is spaced the required distance from the face 46 by an adjustable spacing member 49 so that the face 50 of the spool 48 will partially uncover the port 51. The spacing member 49 may consist of a bolt threaded into the end of the member 42 and held in desired position by a lock nut 52.

The tracer 15 has an integral ball shaped portion 53 by which it is supported in a socket 54 carried by the flexible diaphragm 55. The diaphragm is clamped between the end of the valve housing 56 and the abutting end of the closure plate 57 which is threaded onto the end of the housing. The tracer has a rounded end 58 which extends into a conical socket 59 formed in the end of the spool 48. A spring 60 is interposed between the end of the housing 56 and the member 42, for continuously holding the parts in end-to-end contact, and thereby normally holding the tracer 15 in coaxial alignment with the valve parts. It will be apparent, however, that upon direct axial pressure being applied to the tracer 15, the diaphragm 55 will flex a predetermined amount and thereby cause shifting of the tracer valve parts against the compression of spring 60; or upon lateral pressure being applied to the tracer 15, the end 58 of the tracer will climb the side of the conical depression 59 and thereby cause axial movement of the tracer valve parts. It should also be noticed that when the tracer is free, the spring 60 will shift the parts a sufficient distance against the resistance of the diaphragm to close ports 45 and 47 and completely open ports 44 and 51.

The port 51 is connected by channel 61', ports 197 and 157 of valve 89, and channel 61 to a first pump 62, which has an intake 63 through which fluid is withdrawn from reservoir 64; and a relief valve 65 connected to channel 61 to limit the pressure therein. The channel 61 has a branch connection 66 connected to a resistance coil 67, the terminus 68 of which returns to reservoir. The tracer valve has an additional port 69, located midway between ports 51 and 47, which serves as a reservoir connection, the port 69 being connected to reservoir through channel 70. It will now be seen that the pump 62 will be continuously delivering fluid into channel 61, and the pressure will normally depend upon the resistance at port 51, because of the high resistance of coil 67, but this coil will permit a certain amount of leakage to reservoir when the port 51 is completely closed, and will also serve as a dampener to vibration of the fluid during sudden changes in pressure. The pressure in this line is also transmitted through branch 71, interconnected ports 72 and 73 of stop valve 74, channel 75, interconnected ports 76 and 77 of valve 78, and channel 79 to port 80 of cylinder 32 and thereby to the large end of piston 33.

The port 47 of the tracer valve is connected by channel 81 to a second pump 82 which has an intake 83 through which fluid is withdrawn from reservoir 64; a relief valve 84 connected to channel 81; and a high resistance leakage coil 85 which functions in the same manner as coil 67. The pressure established in line 81 by the resistance of port 47 is communicated through channel 86, interconnected ports 87 and 88 of valve 89, channel 90, interconnected ports 91 and 92 of valve 78, and channel 93 to port 94 of cylinder 32 and thereby to the small end of piston 33.

Since the piston 33 is a differential piston, it will be apparent that if the unit pressure established on one side of the piston is equal to the unit pressure established on the other side, that the total pressure in the large end will be greater than the total pressure in the small end, and the piston will move upward, as viewed in Figure 6. It is desirable, however, that when the tracer valve is in a central or neutral position with ports 45 and 44 open equal amounts, that no movement of piston 33 should take place and therefore the resistance at port 51 should be less than the resistance at port 47, assuming that the pumps 62 and 82 are of equal capacity and delivering the same amount of fluid into their respective delivery channels. Therefore the spacing member 49 is so adjusted that the port 51 is open a larger amount than the port 47 so that the resistance of port 51 will be less than the resistance of port 47, whereby a higher unit pressure will be established in line 81 than in line 61. If the piston 33 has a 2-1 differential area, then the unit pressure in channel 81 should be twice that in channel 61.

In this machine the cutting or feeding stroke corresponds to upward movement of the tracer and cutter, and therefore the connections are such that fluid pressure will be delivered to port 95 of cylinder 16 and thus to the small end of piston 17. This will cause rotation of the shaft 21 in such a direction that the cutter and tracer will move upward. Fuid for causing this feeding movement is supplied by a third pump 96, which has an intake 97 through which fluid is withdrawn from reservoir 64, and a delivery channel 97' which terminates at port 98 of valve 78. This channel also has a relief valve 99' connected thereto to limit the pressure therein.

During a cutting stroke, the stop valve 78 is in such a position that the port 98 is interconnected by an annular groove 99 to port 100, which in turn is connected by a channel 101 to port 102 of valve 89. This port is connected by annular groove 103 to port 104, which in turn is connected by channel 105 to ports 106 and 107 of a rate control valve 108. The valve 108 has a plunger 109 which is normally urged in one direction by a spring 110 against the periphery of a feed rate control cam 111. This cam is supported on a shaft 112 which may be rotated through suitable means to variably control the longitudinal position of plunger 109. This plunger has a central spool 113 terminating at opposite ends in tapered portions 114 and 115 which form resistances to flow through ports 106 and 107.

The feed rate control valve 108 is primarily a flow dividing valve in which the quantity of fluid flowing through ports 106 and 107 can be varied by proportionately varying the resistances at these ports, but in order to maintain the division of flow, it is necessary to provide a balancing valve 116. This valve has a couple of ports 117 and 118 which are connected by channels 119 and 120 respectively to ports 121 and 122 of the rate valve 108. The valve 116 has another pair of ports 123 and 124, the port 123 being connected to reservoir through channel 70, and the port 124 being connected by channel 125 to port 95 of the feed cylinder 16.

A plunger 126 is reciprocably mounted in the balancing valve and has a central spool 127 which is of sufficient width to partly close the ports 123 and 124 when in a central position. This serves to form resistances at these ports which balance with the resistances at ports 106 and 107 to maintain equal pressures in channels 119 and 120 so that the division of flow is maintained. The annular grooves 128 and 129 formed in the plunger 126 are in constant communication with ports 117 and 118, and each groove has a diametrical bore 130 which intersect axial bores 131 and 132 terminating at opposite ends of the plunger. By means of these connections the pressure in channels 119 and 120 is communicated to the ends of the valve and thereby act on opposite ends of the plunger. It will now be apparent that if the pressure in either line is greater than that in the other line, that the plunger 126 will shift due to the unequal pressures on the ends thereof, and thus readjust the hydraulic resistances at 123 and 124 until equal pressures are again established in lines 119 and 120. In this way a division of flow is established whereby part of the fluid delivered by pump 96 may be by-passed to reservoir and the remainder utilized for feeding purposes.

The other end of cylinder 16 is provided with a port 133 which is connected by channel 134 to port 45 of the tracer valve. Thus the feed line is connected to one end of cylinder 16, and the other end is connected to reservoir through ports 45 and 44. The result would be a substantially constant feeding movement of the tracer and cutter, but changes in the contour of the pattern resulting in movement of the tracer will tend to close either port 44 or 45 depending upon the direction of movement of the valve member 42 thereby throttling the return flow from cylinder 16 and retarding the feed rate. Movement of the tracer will also inversely change the resistances at ports 47 and 51 thereby unbalancing the pressure on opposite ends of piston 33 whereby the work may be adjusted toward and from the cutter in accordance with variations in the pattern.

At the end of the upward stroke of the cutter and tracer, a dog 135 carried by the tracer support as shown in Figure 1, rotates the lever 136 in a counterclockwise direction thereby pulling the rod 137 and rotating the crank 138. This crank is connected to the lower end of a shaft 139 which has a lever 140 keyed to it, Figure 3. This lever has a lost motion connection with a bell crank 141 which is supported for free rotation on the shaft 139. The lever 140 has a pair of upstanding lugs 142 and 143. Upon rotation of the lever 140 in a counterclockwise direction, the lost motion between the lug 143 and the arm 144 of the bell crank 141 will be taken up during which time the spring pressed detent 145 will be riding to the peak 146 located between the indents 147 and 148 formed in the periphery of the lever 140. After the lever 140 has rotated a sufficient amount for the detent lever to pass over the peak 146, the device will fire, and shift the valve plunger 149, to which the other arm of the bell crank 141 is connected by pin 150, to a right hand position.

Referring to Figure 6, this will result in the closing of port 104 and the interconnection of port 102 to port 151. The feed pump 96 will now be connected through branch line 152 and line 134 to the right hand end of cylinder 16, tending to cause downward movement of the tracer and cutter. It will be noted that this is a direct connection by-passing the feed rate valve, whereby a rapid traverse movement can be effected. The other end of cylinder 16 is connected, through a branch line 153 of line 125, to port 154, and thus to port 155 and reservoir line 156. Shifting of plunger 149 to the right closed port 197 and interconnected port 157 with port 87, thus interconnecting two separate circuits. In other words, the delivery from pump 82 will flow through channel 86 and port 87 to port 157 and the combined flow from these two pumps will continue through channels 61 and 71, interconnected ports 72 and 73 of stop valve 74, channel 75, interconnected ports 76 and 77 of valve 78, and channel 79 to the lower end of cylinder 32 and effect a rapid traverse outward movement of the work and cutter supports.

The fluid from the other end of cylinder 32 will travel through channel 93, interconnected ports 92 and 91 of valve 78, channel 90 to port 83 of valve 89, the last named port now being connected to the reservoir port 158. The result will be that the work and pattern supports will start to move away at a rapid traverse rate from the cutter and work supports; and the cutter and work supports will start to move downward at a rapid traverse rate. In order to insure that no interference takes place during these rapid traverse movements between the pattern and tracer, the pattern support may be provided with a special block 159 which has an outwardly beveled surface 160 which projects beyond any part of the pattern so that the tracer will move upward on this surface a desired amount before the valve is tripped whereby, should the tracer start downward slightly before the work and pattern supports retract, no interference will take place.

As the pattern carrier continues its outward movement, a dog 161 on the carrier hits a projecting lug 162 on a trip lever 163 thereby rotating the lever in a clockwise direction, as viewed in Figure 1. This lever is connected by a rod 164 to a crank 165 keyed to a vertical shaft 166. As shown in Figure 3, the shaft 166 has a lever 167 keyed thereto which carries a pair of upstanding lugs 168 and 169. This lever has a lost motion connection with a valve shifter 170 which is supported for free rotation on the shaft 166. The valve shifter has a lug 171 which projects between the parts 169 and 168 whereby upon rotation of the lever 167, the lug 169 will take up the lost motion between it and the lug 171, and while so doing, a detent lever 172 is riding up the inclined surface 173 of indent 174 formed in the periphery of lever 167. When the detent 172 passes over the peak 175, it is spring pressed into the indent 176 whereby the parts are fired and the valve plunger 177 is shifted to the right.

Referring to Figure 6, this will effect interconnection of port 72 with port 178, and port 73 with port 179. This results in port 72, which is a pressure port and supplied from pump 62, being connected to reservoir through channel 90, interconnected ports 88 and 158, and channel 156. This cuts off the supply of fluid pressure from port 94 of cylinder 32. In addition, the interconnection of port 73 with port 179 resulted in the other port 80 of cylinder 32 being connected to the reservoir line 156. Since both ends of cylinder 32 are now connected to reservoir, further outward movement of the work and pattern supports will terminate.

In the meantime, the tracer and cutter supports were moving downward and this movement will continue until a dog 180 actuates the trip lever 136, as shown in Figure 1, and shifts the valve plunger 149 of valve 89 to the left. This will break the reservoir connection of port 178 of valve 74, by disconnecting port 88 from port 158 whereby the fluid pressure being supplied to port 72 will now continue through channels 90 and 93 to port 94 of cylinder 32 causing the work and pattern supports to move inward at a rapid rate because the other end of the cylinder is connected to reservoir. In addition, the port 88 is interconnected to the pressure port 87 which is a delivery port of pump 82 whereby the delivery from this pump will also be discharged into channel 90. The shifting of plunger 149 also re-established the feed line connection between ports 102 and 104 whereby fluid will be delivered through channel 125 to port 95 of cylinder 16. But since channel 134 which is connected to port 133 is blocked at port 45 due to the tracer being undeflected, no oil can escape from cylinder 16 and therefore no upward movement of the tracer and cutter will take place.

As the pattern and work supports move inward, the dog 161 will engage a second lug 181 on trip lever 163, Figure 4, rotating the same in a counterclockwise direction and thereby shifting the valve plunger 177 back to the position in which it is shown in Figure 6. This will disconnect port 72 from channel 90 through the closing of port 178 so that the only fluid supply to channel 90 is from pump 82. Shifting of valve plunger 177 will also disconnect port 73 from port 179 and connect it to port 72 whereby the pump 68 is reconnected to port 80 of cylinder 32. Since the tracer is undeflected, port 51 of the tracer valve will still be open and therefore interconnected with the reservoir port 69 whereby pump 62, due to the interconnection of ports 157 and 197, will be discharging to reservoir and therefore unable to build up pressure in the large end of cylinder 32 whereby the piston 33 will continue its downward movement, as viewed in Figure 6, to bring the work and pattern into engagement with the cutter and tracer. The movement will continue until the pattern deflects the tracer and shifts the tracer valve a sufficient amount to increase the resistance at port 51 to the required degree that will raise the pressure in the large end of cylinder 32 equal to the pressure in the other end of the cylinder. Shifting of the tracer valve will also interconnect port 45 with port 44 whereby fluid can now escape from the large end of cylinder 16 whereby the feeding movement will now start and the cycle will repeat itself.

The machine may be stopped at any time by shifting the plunger of stop valve 78 to the left as viewed in Figure 6. The mechanism for shifting the valve comprises a hand lever 182 pivotally mounted on an overhanging bracket 183 which projects from the column 11, as shown in Figure 1, and this lever is connected by a second lever 184 which is pivotally connected to a link 185. The link is pivotally connected through a crank 186 for rotation of a vertical shaft 187. This shaft, as shown in Figure 3, has a detent plate 188 integrally connected thereto, which has indents 189 and 190 formed in its periphery. A spring pressed detent 191 is held in engagement with these indents.

The plate carries a pin 192 which has a lost motion connection with a notch 193 formed in the periphery of a shifter lever 194. This shifter lever is operatively connected to the valve plunger 195. When the shaft 187 is rotated in a counterclockwise direction, as viewed in Figure 3, the valve plunger 195 is shifted to the left, as viewed in Figure 6, thereby disconnecting the pump port 98 of the feed pump 96 from port 100 and interconnecting it to the reservoir port 196. This will terminate the feed movement. In addition, port 77 and 92 will be closed whereby both ends of cylinder 32 are isolated from the rest of the circuit and the fluid in the cylinder will be impounded.

At the end of each cutting stroke it is desirable that the work and pattern supports be indexed, but since the indexing mechanism forms no part of the present invention, any suitable form of indexing means may be utilized, such as the indexing mechanism shown in the copending application, Serial No. 138,639, filed April 23, 1937.

There has thus been provided a simple, inexpensive but highly efficient control circuit having separate pump circuits, one of which controls the feed movement, and two of which are connected to a motor for controlling the cross feed movement, means to vary the opposing pressures created by said pumps to vary the amount of said cross feed movement, and means to damp out oscillations caused by sudden changes in the opposing pressures.

What is claimed is:

1. In a pattern controlled machine tool having a relatively bi-directionally movable cutter support and work support, the combination of a piston operatively connected for effecting one direction of movement between the supports, a pair of pumps connected respectively to opposite ends of the piston, a tracer controlled valve, and means in the valve for variably impounding the fluid delivered by the pumps to differentiate the resultant opposing pressures on the piston and thus determine the directions of said relative movement.

2. In a pattern controlled machine tool having a cutter support and a work support, the combination with means for effecting a relative unidirectional feeding movement between the supports, of a piston operatively connected for effecting a reversible movement between the supports angularly related to the direction of said feeding movement, fluid channels for supplying fluid pressure to opposite ends of said piston, a tracer controlled valve, separate means for supplying fluid pressure to said channels, means in the valve for controlling the pressure in each channel, said valve having a central position for equalizing the resultant pressures on the piston to prevent movement, and other positions for differentiating the resultant pressures to effect reversible movement in accordance with variations in a pattern.

3. In a pattern controlled machine tool having a cutter support and a work support, the combination with means for effecting a relative feeding movement between the supports, of a hydraulic motor operatively connected for causing movement in an angular direction to the feeding movement, a pair of pumps connected to said motor for effecting opposite directions of movement thereof, a tracer controlled valve, and means in the valve for variably impounding the fluid delivered by said pumps to equalize or differentiate the resultant opposing pressures on the motor and thus determine the amount of angular movement between the supports.

4. In a contouring machine having a cutter support and a work support, the combination with fluid operable means for effecting a relative feeding movement between the supports, of a tracer controlled valve having a tracer adapted to engage a pattern jointly movable with one of said supports, a relatively movable piston and cylinder, one of which is fixed and the other connected to one of said supports for effecting movement thereof toward and from the other support, a pair of pumps, separate channel means connecting the pumps to opposite ends of the cylinder, means in the tracer controlled valve for by-passing fluid from each of said channels to reservoir to variably control the pressure therein, said valve having a first position for creating equal opposing pressures on said piston to prevent movement between the supports, and additional positions on either side thereof for inversely changing the opposing pressures on said piston for causing opposite directions of movement of the connected support.

5. In a contouring machine having a cutter support and a work support, the combination with a cooperating pattern and tracer jointly movable with the respective supports, of means for producing an undulating cutting path in accordance with the contour of the pattern, including a first fluid operable means for effecting one direction of movement, a second fluid operable means for effecting another direction of relative movement between said supports, embodying a fluid operable motor having a pair of ports, independent means for supplying fluid pressure to said ports, and valve means controlled by the tracer for inversely impounding the fluid delivered to said ports for causing reversible operation of said motor.

6. In a machine tool, the combination with a tool support and work support, of means for effecting relative movement between the supports, including a piston and cylinder, one of which is attached to the movable support and the other fixed with the machine, separate control circuits connected to the respective ends of the cylinder, each circuit including a pump, and a hydraulic resistance connection to reservoir, whereby the resistances may determine the total resultant pressures on opposite ends of the piston, and means to inversely change said hydraulic resistances to control movement of said piston.

7. In a machine tool, the combination with a tool support and a work support, of means for effecting relative movement between the supports, including a piston and cylinder, one of which is attached to the movable support and the other fixed with the machine, separate hydraulic circuits connected to the respective ends of the cylinder, each circuit including a pump, and a hydraulic resistance connection to reservoir, whereby the resistances may determine the resultant opposing pressures on the piston, means to inversely change said hydraulic resistances to control movement of said piston, and means to interconnect said circuits whereby the delivery from both pumps will flow to one end of the cylinder to effect a rapid traverse movement of the connected support.

8. In a machine tool having a cutter support and a work support, the combination of transmission means for effecting relative movement between the supports along two angularly related paths, including a first piston and cylinder, one of which is connected for effecting movement along the first path; a second piston and cylinder, one of which is connected for effecting movement along a second path; a first pump; a control circuit coupling the pump for actuation of the first piston in either of two directions; a second and third pump; separate hydraulic circuits connecting said pumps to opposite ends of the second cylinder; hydraulic resistance by-passes in each of said separate circuits for controlling the pressure of fluid therein and thereby the opposing resultant pressures on the second piston; and means to inversely vary said pressures whereby the second piston may be caused to remain stationary, or to be moved in either one of two directions during uni-directional actuation of the first named piston.

9. In a profiling tool having a cutter support and a work support, the combination of hydraulic motors operatively connected to the respective supports for effecting movement thereof, means for supplying fluid under pressure to said motors, a tracer simultaneously movable with one of said supports for engagement with a pattern movable with the other of said supports, valve means controlled by the tracer for governing the distribution of fluid to said motors whereby an undulatory cutting path between the cutter and work may be generated, and means trip operable by one of said supports for simultaneously reversing the direction of movement of each of said supports whereby the work will be separated from the cutter during rapid return movement of the supports.

10. In a pattern controlled machine tool having a cutter support and a work support, and hydraulic motors operatively connected to the respective supports for effecting relative movement therebetween in two directions, the combination with a tracer movable with one of said supports for engagement with a pattern movable with the other, of control means for said motors including a first pump for supplying fluid to one of said motors, a pair of pumps for supplying fluid to the other motor, hydraulic resistances controlled by the tracer for controlling the discharge from said pair of pumps and thereby determining the opposing pressures on the connected motor and its direction of movement to effect approach and retraction movements between the work and cutter, and fixed hydraulic resistance leaks connected with each of said pair of pumps for damping oscillation in the respective pump circuits.

11. In a pattern controlled machine tool, the combination with a fluid operable slide for effecting relative movement between a cutter and a work piece, of means for controlling said movement including a tracer controlled valve, a pair of pressural control channels terminating in ports in said valve for governing movement of said slide, a first spool in said valve for determining the resistance at one of said ports and thereby the pressure in one of said channels, a second spool in said valve for determining the resistance at the other of said ports and thereby the pressure in the other of said channels, means for urging said spools toward one another, and adjustable separating means between said spools whereby the resistance offered by one of said spools may be independently adjusted with respect to the resistance offered by the other of said spools.

MARIO E. MARTELLOTTI.